March 3, 1942. H. M. BACH 2,274,648
VARIABLE ELECTRONIC REACTANCE
Filed May 2, 1940 3 Sheets-Sheet 1
FIG. 1.
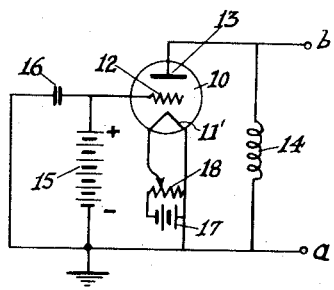
FIG. 2.
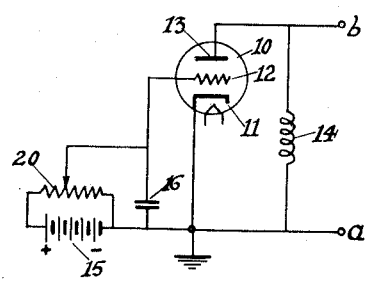
FIG. 3.
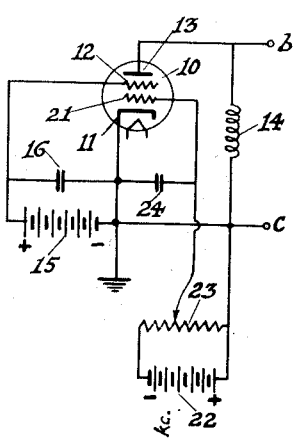
FIG. 4.
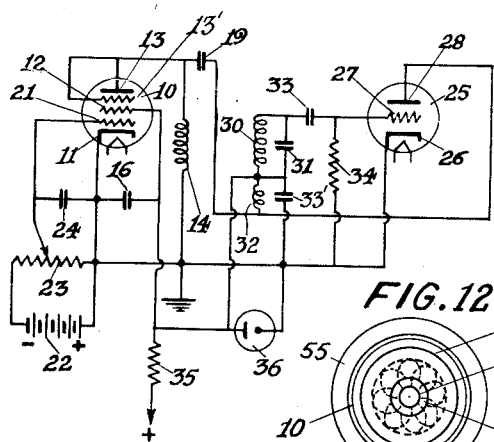
FIG. 5.
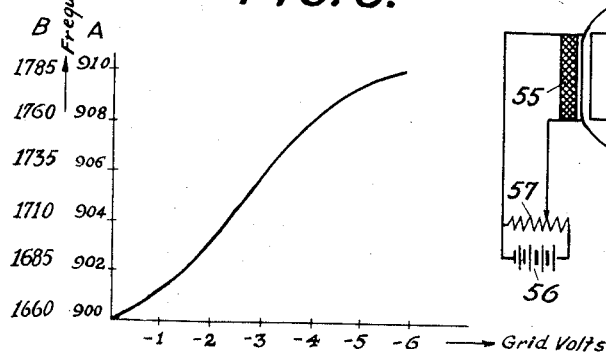
FIG. 12.
FIG. 12A.
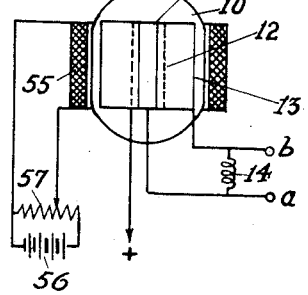
INVENTOR
HENRY M. BACH
BY
ATTORNEY March 3, 1942.  H. M. BACH  2,274,648
VARIABLE ELECTRONIC REACTANCE
Filed May 2, 1940  3 Sheets-Sheet 2

INVENTOR
HENRY M. BACH
BY
ATTORNEY

INVENTOR
HENRY M. BACH
BY
ATTORNEY

Patented Mar. 3, 1942

2,274,648

UNITED STATES PATENT OFFICE 2,274,648

VARIABLE ELECTRONIC REACTANCE

Henry M. Bach, Woodmere, N. Y., assignor to Radio Patents Corporation, a corporation of New York Application May 2, 1940, Serial No. 332,931

2 Claims. (Cl. 178—44)

The present invention relates to electronic reactance devices or circuits therefor and methods of operating such devices and has for its main object to provide a device of this type the reactance of which can be easily and efficiently controlled in accordance with variations of an electrical magnitude such as a variable electrical potential or current.

A more specific object of the invention is the provision of an electronic reactor tube associated with an electrical circuit for controlling the effective reactance of the circuit in proportion to variations of an electric controlling potential or current.

Another object is to provide an electronic reactor tube, the reactance of which can be controlled within a substantial operating range and in a most dependable and efficient manner by varying an electric potential or current.

A further object is the provision of an electronic reactor tube operatively associated with an oscillating system to form part of the effective reactance of the system and being adapted to be controlled within a substantial operating range in accordance with variations of an electric potential or current.

Still a further object is the provision of a variable electronic reactor tube operatively associated with an oscillator or generator of high frequency currents in such a manner that the tube forms an effective tuning reactance of said oscillator determinative of the oscillating frequency to be controlled over a wide range by varying a control potential or current affecting one or more operating characteristics of said tube.

Another object is to provide an oscillator or generator for high frequency currents, the frequency of which can be directly controlled within wide limits in accordance with variations of a control potential or current.

Still another object is the provision of an oscillator or generator of high frequency oscillations the frequency of which can be controlled within substantial limits to directly effect wide band frequency modulation in accordance with variations of sounds or other modulating signal energy.

Figure 6:
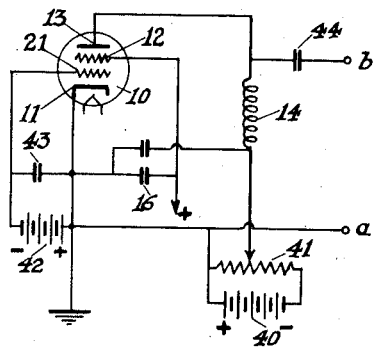
Figure 7:
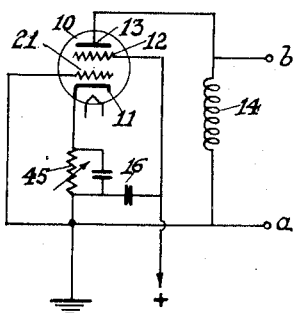
Figure 8:
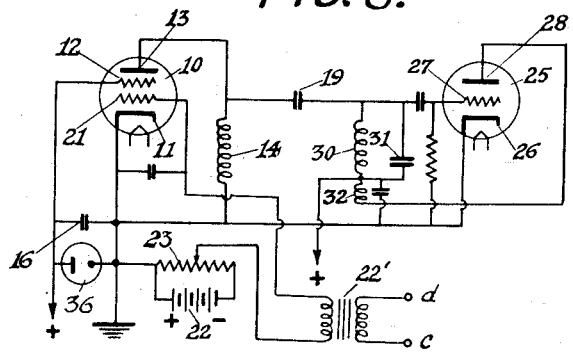
Figure 9:
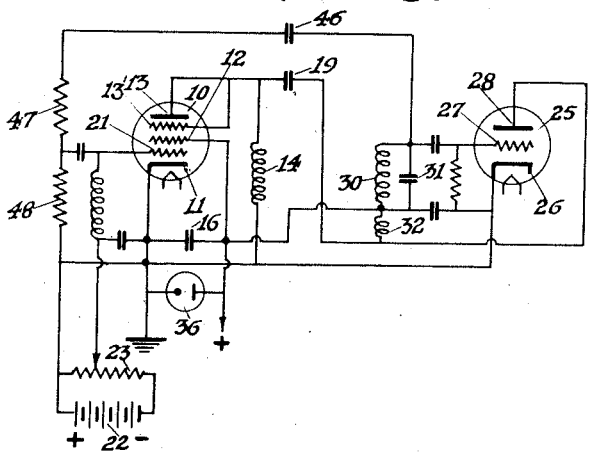
Figure 10:
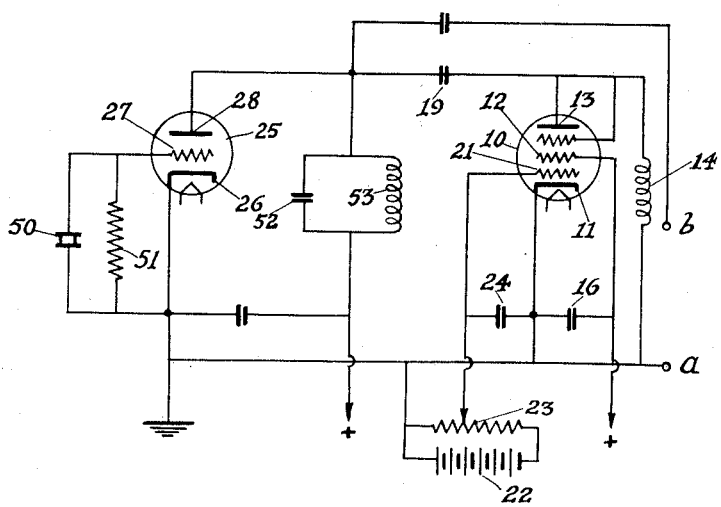
Figure 11:
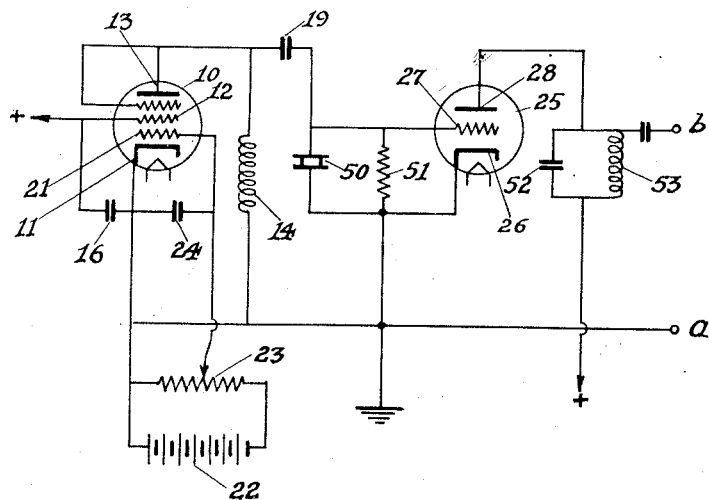

The above and further objects of the invention will become more apparent from the following detailed description taken with reference to the accompanying drawings forming part of this specification and wherein:

Figure 1 shows a simple diagram of an electronic capacitor tube and a method of controlling the same according to the invention, Figures 2 and 3 show similar capacitor tube circuits embodying modified control means, Figure 4 is a diagram of a regenerative oscillator embodying a variable reactor tube operatively connected therewith according to the invention for controlling the oscillating frequency, Figure 5 is a graph illustrative of the function of and results obtained by a system according to Figure 4, Figures 6 and 7 are diagrams showing alternative methods of controlling a capacitor tube according to the invention, Figures 8 and 9 are diagrams showing modifications of oscillating circuits employing electronic frequency control according to the invention, Figures 10 and 11 show further exemplifications of the invention embodied in a piezo-electric crystal oscillator for effecting phase and/or frequency control or modulation, and Figures 12 and 12A illustrate diagrammatically a different construction for an electronic reactor tube utilizing a magnetic field for producing and controlling electronic capacity according to the invention.

Like reference numerals identify like parts throughout the different views of the drawings.

With the foregoing and further objects in view as will appear hereinafter, the invention contemplates the use of an electron discharge tube as an electrical capacitor or reactor, said tube comprising at least a cathode or source of electrons, an accelerating electrode and a plate or output electrode acting as a decelerating electrode and which for this purpose is polarized negatively with respect to the accelerating electrode in order to form a concentrated space charge or virtual cathode between the accelerating electrode and the decelerating electrode. Due to the formation of this virtual cathode, a 90° phase shift is secured for the potential difference between the plate and said virtual cathode and the discharge device will behave substantially like a condenser the electrical capacity of which varies as a function of a number of variables such as the number of electrons in the discharge, that is the electron density or intensity of the virtual cathode, the velocity or speed of the electrons imparted to them by the accelerating electrode, and the retarding effect of the decelerating electrode resulting in a variation of the distance of the virtual cathode from the plate or other output electrode. When the virtual cathode is nearer the plate, the capacity of the condenser will be greater than when the virtual cathode will be removed from the plate. Similarly, when the virtual cathode is maintained at a fixed distance from the plate and its density or concentration is increased, the capacity of the condenser will be likewise increased. This explanation, however, is not to be interpreted as a final commitment as to the theory and function of the novel electronic capacitor forming the subject of the invention as it is possible that other functions are responsible singly or in combination for the capacity variations and other results which have been verified by practical experiments.

Referring more particularly to Figure 1, there is shown a capacitor tube circuit according to the invention in its simplest form with all unnecessary elements omitted therefrom for the sake of clearness of illustration. The tube shown in the example is an ordinary three-element electron tube or triode 10 of known design having a source of electrons or cathode 11' which in the example shown is of the directly heated or filamentary type, an accelerating electrode or grid 12 and a decelerating electrode or plate 13. The latter in the example shown is maintained at the same steady or D. C. potential as the cathode, while the grid 12 is maintained at a steady positive potential with respect to the filament or cathode by any suitable means such as by a battery 15 or the like and by-passed to cathode or ground for alternating or oscillating currents through a condenser 16. The plate 13 is returned to ground or cathode through a choke coil 14 or the like presenting high impedance to alternating current and providing a short circuit for direct current, and furthermore provision is made to control the electron emission by the filament 11' by means of a varying heating voltage supplied by a battery or other heating source 17 in conjunction with an adjustable potentiometer resistance 18.

In an electron tube circuit of the type afore-described, the electrons emitted by thermionic action from the filament 11' are accelerated towards the grid 12 at a speed which is a direct function of the electric field strength produced by the grid assuming uni-velocity electrons to be emitted from the filament. Most of these electrons will pass through the openings or meshes of the grid and fly towards the plate 13 by virtue of their velocity or kinetic energy imparted to them by the accelerating field. These electrons will be retarded and repelled by the decelerating potential of the plate and hence they will form a concentrated electron space charge or virtual cathode at some point between the grid and the plate. The capacity between this virtual cathode acting as one electrode of a capacitor with the plate forming the cooperating capacitor electrode represents the electronic capacity provided by an arrangement of this type. The terminals a—b of the condenser are the cathode and the plate of the tube, the former constituting the connecting element to the virtual cathode by way of the space current emitted from the filament or cathode and passed through the tube.

Figure 1 shows one method of varying the capacity of the electronic capacitor whereby the accelerating potential on the grid 12 is maintained at a constant value and the number and initial velocity of the electrons emitted from the filament is varied by controlling the filament temperature. Experiments have shown that the capacity increases as the filament heating voltage is increased as predicted by the theory. No substantial steady electron current is conveyed to the plate and the device was found to behave substantially in the manner of an electrical condenser.

Figure 2 shows a circuit employing an alternative method of controlling an electronic capacitor in accordance with the invention. The cathode 11 which in the example shown is of the indirectly heated or equi-potential type is heated to constant emitting temperature and the accelerating potential on the grid 12 is varied by the aid of an adjustable potentiometer resistance 20 shunted across the accelerating voltage source 15. In an arrangement of this type the velocity and number of the electrons accelerated from the cathode are increased as the grid potential is increased, thus enabling the electrons to move to a point closer to the plate before being retarded or repelled. As a result the virtual cathode or electron sheath will also be closer to the plate resulting in a capacity increase with increasing accelerating voltage as has been confirmed by experiments.

Figure 3 illustrates another method of capacity control especially suited for practical application of the invention. As it is usually desirable that the controlling potential should not draw any power from the controlling source, a further negatively biased control grid 21 is shown arranged between the accelerating grid 12 and the source of electrons or cathode 11. The grid 21 in the example shown is variably negatively biased from a suitable source such as a battery 22 or the like in conjunction with an adjustable potentiometer resistance 23, the latter being by-passed to cathode or ground for alternating or oscillating potential through a condenser 24. Here the number of electrons accelerated towards the grid 12 as well as the velocity of the electrons passing the openings or meshes of the grid are determined by the bias voltage on the control grid 21 and in turn again the capacity of the electronic condenser will be determined by the negative bias on the control grid. With greater negative bias on the control grid the capacity is decreased as will be readily understood from the above.

Figure 4 shows a reactor tube circuit of the type according to Figure 3 operatively associated with a regenerative electron tube oscillator for controlling the oscillating frequency. The oscillator shown is of standard type comprising a triode 25 having a cathode 26, a control grid 27 and an anode or plate 28. An oscillatory or tank circuit comprising an inductance 30 shunted by a condenser 31 is connected to the grid 27 and cathode 26 of the oscillator tube by way of coupling condensers 33 and 33', respectively, and the grid 27 is further connected to cathode or ground through a grid-leak or biasing resistance 34. Sustained electrical oscillations are maintained in the circuit 30—31 by the provision of a feedback or tickler coil 32 arranged in inductive relation with the oscillating inductance 30 and inserted in the plate circuit of the tube, the latter including further a voltage drop or bleeder resistance 35. Item 36 is a gas discharge tube connected between the end of the resistance 35 remote from the positive pole of the source of space current for the oscillator and accelerating potential for the reactor tube and ground to act as a stabilizer for steadying the plate potential for the oscillator 25 and the screen grid or accelerating potential for the reactor tube 10 if the operating potential is supplied from a source subject to fluctuations. The tube 10 is effectively shunted across the feedback or tickler coil 32 as far as oscillating currents are concerned thereby forming an effective tuning reactance for the oscillating or tank circuit 30—31 and determining the frequency of the oscillations produced. The latter may be controlled by varying the bias on the grid 21 or in any other suitable manner understood from the above. Any other electrostatic or electro-magnetic control of the space current of the tube may be employed for controlling the capacity of the tube and in turn the oscillating frequency as is understood. Moreover, the oscillator may be of any known type with the reactor tube 10 operatively associated therewith in any suitable manner to constitute an effective tuning reactance determining the oscillating frequency. Furthermore, the oscillating currents may be impressed upon a load or utilization circuit as will be understood by those skilled in the art.

Figure 5 is a graph showing the oscillating frequency in kilocycles plotted as a function of the grid bias obtained by a control system according to Figure 4 as a result of extensive experiments carried out by applicant. As is seen, referring to the scale of frequencies designated by A in Figure 5 a variation of the grid bias from 0 to —6 volts in the example illustrated will produce a frequency variation within a range of about 10 kilocycles. This applies to experiments carried out with a large tuning capacity 31 of the oscillating circuit. If the capacity 31 was decreased by using a relatively higher oscillating frequency or increasing the inductance 30, considerably greater relative frequency variation was obtained which in one example (see scale of frequencies designated by B in Figure 5) covered a range of about 130 kc. at 1600 kilocycles, thereby making it possible to directly obtain wide band frequency modulation in a single oscillator stage substantially without subsequent frequency multiplication as required in existing methods of frequency modulation at present being used.

When using the circuit according to Figure 4 or any of the circuits described in the following for frequency modulation for broadcasting or other purposes, the control system 22, 23 is replaced by a suitable source of modulating signals such as an audio frequency transformer energized by the output of a microphone circuit or other modulating system as shown in Figure 8 to be described later. Condenser 24 by-passing the portion of the potentiometer resistance 23 supplying the grid control voltage serves to offer negligible impedance for the carrier frequency and high impedance for the controlling or modulating frequencies. If the circuit is used for producing frequency modulated oscillations, preferably a fixed negative biasing potential is applied to the control grid to allow the tube to operate on the desired section of the operating curve. Thus, in case of a curve shown in Figure 5 referring to frequency scale A, if ±5 kilocycles frequency modulation is desired at 905 kilocycles carrier frequency, the fixed bias on the grid 21 in Figure 4 would have to be —3 volts and the modulating voltage superimposed upon the fixed biasing voltage would have to cover a range of ±3 volts if use is made of the full operating range as will be understood.

Again, referring to scale B in Figure 5 and assuming a normal (carrier) frequency of about 1730 kilocycles, a modulation over a range of ±50 kilocycles is obtained by adjusting the normal or steady grid bias of the control tube to about —3 volts and superimposing thereon a modulating signal potential varying between ±2 volts. In case of short or ultra-short waves at present used for frequency modulation, a still greater deviation may be obtained thus making it possible to completely eliminate the necessity of frequency multiplication and other means used at present to secure wide band frequency modulation.

It will be obvious to anyone skilled in the art that any suitable type of electron tube having the fundamental elements as pointed out above may be employed for practicing the invention. Thus, a tube of the pentagrid converter type may be used advantageously with the anode grid, the injector grid and the screen grid tied together to serve as the accelerating electrode in which case a greater capacity change or frequency deviation is obtained compared with a single grid tube. When using a pentode of known design the suppressor grid 13' (see Figure 4) arranged adjacent to the plate 13 is advantageously directly tied to the plate also resulting in a capacity increase due to increase of the effective surface area of the combined suppressor and plate acting as a decelerating electrode. Accordingly, the plate or other decelerating element forming an electrode of the condenser is advantageously constructed such as in corrugated or pleated shape to provide maximum surface area in a given available mounting space and to ensure maximum capacity or frequency deviation. It is furthermore apparent that with a greater positive accelerating potential on the screen grid or other accelerating electrode a greater capacity deviation will be accomplished. Hence, a beam power tube or an audio frequency pentode power tube of known construction both of which have much greater screen dissipating power will allow greater deviation than can be obtained with a small radio frequency or receiving type pentode.

Figures 6 and 7 illustrate further methods of controlling the capacity of a reactor tube according to the invention. According to Figure 6, the distance of the virtual cathode from the plate 13 or other decelerating electrode is varied by means of a variable retarding potential applied to the plate in place of a fixed decelerating potential employed in the preceding illustrations. The remaining parameters in this case are maintained constant although they too may be varied in order to modify the operating characteristics of the tube to suit any existing requirements. If a separate control grid 21 is provided, the latter may be negatively biased with respect to the cathode by the provision of biasing battery 42 by-passed for alternating current by a condenser 43. The retarding potential for the plate is supplied in the example shown by a battery and associated adjustable potentiometer 41, but may also be supplied by an audio frequency transformer or the like if the tube is used for frequency modulation in the manner described hereinabove. Item 44 is a blocking condenser to prevent direct current from the source 40 from entering the associate circuit connected to the capacitor terminals a—b.

According to a further feature of the invention, more than one control may be employed simultaneously such as by varying the potential on the control grid 21 together with the retarding potential on the plate 13 by the provision of a variable resistor 45 in the common cathode return lead for the grid and plate circuits by-passed for alternating currents by means of a condenser as shown in Figure 7. This variable cathode resistor causes the cathode to be positively biased with respect to ground by virtue of the cathode current flowing through this resistor. This in turn effectively renders the control grid and retarding plate simultaneously negative with respect to the cathode and in addition tends to slightly reduce the voltage on the accelerating grid.

Figure 8 shows an oscillating system substantially similar to Figure 4 wherein the electronic capacitor or reactor tube is effectively shunted across the oscillating tank circuit 30—31 to effect a frequency control in accordance with the invention. There is further shown in this diagram a transformer 22' having its primary terminals c—d connected to any suitable source of modulating currents such as the output of a microphone and having its secondary connected in series with the fixed grid biasing source 22—23 to produce frequency modulated oscillations. The steady negative grid bias is fixed at some definite point of the operating point as described hereinabove by adjusting the potentiometer resistance 23 and the modulating voltage is used to instantaneously swing the bias below and above the steady operating point in a manner described hereinabove and well understood by those skilled in the art.

Figure 9 shows another embodiment of the invention. According to this modification the control tube 10 is effectively connected across the feedback or tickler coil 32 of the oscillator in a manner similar to Figure 4, and in addition a small radio frequency voltage from the grid circuit of the oscillator is applied to the control grid 21 of the reactor tube by way of a potential divider comprising resistors 47, 48 in series. The reactor tube may be controlled by any of the methods as shown in the previous figures.

Due to the properties of a vacuum tube the voltage on the grid of the oscillator is 180° out of phase with the voltage on the plate. Accordingly, the electron stream coming from the cathode of the reactor tube is modulated by the control grid at 180° out of phase with the potential on the plate of the oscillator tube. In addition, a 90° phase shift is produced due to the properties of the reactor tube described hereinbefore and the net result will be that the reactor tube behaves effectively like an inductance because there will actually be a 90° lead of the current in the feedback or tickler coil. Thus, the basic idea of an electronic inductance of this type involves the use of the 90° phase shift occurring in the reactor tube caused by the virtual cathode therein and combining this 90° phase shift with a further 180° phase shift occurring in a normal vacuum tube to effect a 90° shift in the opposite direction from the phase shift caused by the virtual cathode coupling.

Figures 10 and 11 represent exemplifications of a phase shifting or reactor tube embodied in a crystal controlled oscillator for varying the plate tuning capacity and in turn the phase or frequency of the oscillations produced. The crystal controlled oscillator is of known design comprising in the example shown a triode 25 having a cathode 26, a control grid 27 and a plate 28, a piezo-electric crystal 50 and grid-leak resistance 51 connected between the grid 27 and cathode 26 and a plate oscillating or tank circuit comprising condenser 52 shunted by an inductance 53.

The reactor tube or electronic capacitor 10 may be effectively shunted either across the plate circuit (Figure 10) or across the grid circuit (Figure 11) of the oscillator, the operation and function of the system being substantially similar to that of the preceding figures in producing phase or frequency modulated oscillations in accordance with the invention.

Figure 12 illustrates diagrammatically a reactor tube according to the invention using a magnetic field for controlling the capacity. The cathode 11, accelerating grid 12 and plate 13 are of cylindrical shape and arranged concentrically in the manner indicated. A magnet winding 55 energized by a source or battery 56 in conjunction with an adjustable potentiometer resistance 57 serves to produce a magnetic field at right angle to the path of the electrons emitted from the cathode 11 and accelerated towards the plate 13. Due to the combined effect of the electric and magnetic field the electrons will travel along curved paths as indicated by the dotted lines in Figure 12A forming a cross-section through the tube shown in Figure 12. The electrons will be repelled by the plate and a virtual cathode will be formed which may be controlled in substantially the same manner as previously described to affect a capacity control. According to an alternative method, shown in the drawings, the control is affected by varying the magnetic deflecting field by controlling the magnetizing current which will result among other effects in a change of curvature of the electron paths and again in turn in a variable distance of the virtual cathode from the plate and corresponding variation of the capacity appearing between terminals a—b.

As is understood the invention is not limited to self-excited oscillations of the type shown, but applies with equal advantage to electrical circuits such as a resonant circuit energized from an outside source having a fixed or variable frequency in which case the control of the electronic reactor may serve for varying the effective reactance of the circuit for tuning or phase control or modulation. Thus, for instance, in Figure 10 the tube 25 with its associated grid circuit and space current source may be omitted and the circuit 52—53 excited from an outside source such as a separate master oscillator or power amplifier whereby the tuning of the circuit or the phase of the currents established therein by said source may be controlled or modulated by the variable reactor tube in accordance with the invention.

It will be evident from the foregoing that the invention is not limited to the specific details, arrangements of parts and methods of operation shown and disclosed herein for illustration but that the underlying principle of the invention is susceptible of numerous variations and modifications coming within its broader scope and spirit as defined in the appended claims. The specification and drawings are accordingly to be regarded in an illustrative rather than a limiting sense.

I claim:

1. A voltage-operated adjustable condenser for use in alternating current circuits comprising an electron discharge tube provided with an equipotential cathode, an electrostatic control grid, an accelerating grid and a decelerating electrode, all arranged substantially in the order named, means for biasing said accelerating grid at a steady positive potential with respect to said cathode, further means for biasing said decelerating electrode at a steady negative potential with respect to said accelerating grid to substantially prevent an electron current to said accelerating electrode and to produce a sharply defined concentrated electron space charge at a determined distance from said accelerating electrode, thereby to provide an electrical condenser with said cathode and said decelerating electrode as terminals, means to substantially prevent alternating potential from being developed upon said control grid and said accelerating grid, and further means to impress a variable biasing potential upon said control grid to correspondingly vary the capacitance of the condenser.

2. A voltage-operated adjustable condenser for use in alternating current circuits comprising an electron discharge tube provided with an equipotential cathode, an electrostatic control grid, an accelerating grid and a plate, all arranged substantially in the order named, means for biasing said accelerating grid at a steady positive potential with respect to said cathode, further means for biasing said plate at a steady negative potential with respect to said cathode to substantially prevent an electron current to said plate and to produce a sharply defined concentrated electron space charge at a determined distance from said plate, thereby to provide an electrical condenser with said cathode and said plate as terminals, means to substantially prevent alternating potential from being developed upon said control grid and said accelerating grid, and further means to impress a variable biasing potential upon said control grid to correspondingly vary the capacitance of the condenser.

HENRY M. BACH.